(12) United States Patent
Welsh (10) Patent No.: US 11,618,062 B2
(45) Date of Patent: Apr. 4, 2023

(54) PIPE OXIDATION REMOVAL TOOL

(71) Applicant: Christopher John Welsh, Lahaina, HI (US)

(72) Inventor: Christopher John Welsh, Lahaina, HI (US)

( * ) Notice: Subject to any disclaimer, the term of this patent is extended or adjusted under 35 U.S.C. 154(b) by 132 days.

(21) Appl. No.: 16/756,124

(22) PCT Filed: Aug. 14, 2019

(86) PCT No.: PCT/US2019/046571
§ 371 (c)(1),
(2) Date: Apr. 15, 2020

(87) PCT Pub. No.: WO2020/037080
PCT Pub. Date: Feb. 20, 2020

(65) Prior Publication Data
US 2021/0187569 A1    Jun. 24, 2021

Related U.S. Application Data (60) Provisional application No. 62/718,573, filed on Aug. 14, 2018.

(51) Int. Cl.
*B08B 9/045* (2006.01)
*B08B 9/023* (2006.01)
*B08B 9/043* (2006.01)
*B08B 13/00* (2006.01)
*F16L 101/12* (2006.01)

(52) U.S. Cl.
CPC .............. *B08B 9/045* (2013.01); *B08B 9/023* (2013.01); *B08B 9/0436* (2013.01); *B08B 13/00* (2013.01); *B08B 2209/04* (2013.01); *F16L 2101/12* (2013.01)

(58) Field of Classification Search
CPC ......... B08B 9/023; B08B 9/027; B08B 9/045; B08B 9/0436; B08B 2209/04
See application file for complete search history.

(56) References Cited

U.S. PATENT DOCUMENTS

| | | | | |
|---|---|---|---|---|
| 2,812,624 A * | 11/1957 | Henry | ................... | B24B 33/084 451/485 |
| 2,838,121 A * | 6/1958 | Coyle | ..................... | E21B 37/02 166/173 |
| 4,291,764 A * | 9/1981 | Pampell | ................... | E21B 37/02 166/173 |
| 5,829,521 A * | 11/1998 | Brown, Jr. | .............. | E21B 37/02 166/173 |
| 6,106,370 A * | 8/2000 | Carter | ..................... | B24B 9/007 451/440 |

(Continued)

*Primary Examiner* — Randall E Chin
(74) *Attorney, Agent, or Firm* — Donn K. Harms (57) ABSTRACT

A pipe cleaning tool for cleaning pipe surfaces is configured for operative engagement with a drill motor. The cleaning tool includes a body having a sidewall extending between a first end and a second end of the body. Cleaning blades located in each of a plurality of slots which extend to respective openings in the sidewall of the body. The cleaning blades are biased to project past the sidewall and thereby contact a pipe surface positioned adjacent the sidewall to clean the pipe surface of oxidation and dirt when the body of the cleaning tool is rotated by the engaged drill motor.

10 Claims, 4 Drawing Sheets

(56) References Cited

U.S. PATENT DOCUMENTS

| | | | | |
|---|---|---|---|---|
| 6,704,964 B2* | 3/2004 | Knowles | ............... | A46B 13/001 15/104.04 |
| 8,101,026 B1* | 1/2012 | Brooks | ................... | B08B 9/021 134/6 |
| 8,479,354 B1* | 7/2013 | Doyle | ..................... | B08B 9/045 15/339 |
| 8,511,375 B2* | 8/2013 | Hern | ....................... | E21B 37/02 166/173 |
| 2009/0272524 A1* | 11/2009 | Voth | ........................ | E21B 37/02 166/173 |

\* cited by examiner

PIPE OXIDATION REMOVAL TOOL

This application claims priority to U.S. Provisional Patent Application Ser. No. 62/718,573 filed on Aug. 14, 2018, which is incorporated herein in its entirety by this reference thereto.

FIELD OF THE INVENTION

The device herein is generally related to pipe oxidation removal. More particularly, it relates to a power driven device configured for rotational positioning upon pipe end exterior surfaces and the interior surfaces of pipe fittings to remove oxidation and dirt and the like prior to soldering of the pipes with the fittings.

BACKGROUND OF THE INVENTION

In the field of residential and commercial plumbing, copper pipe is widely employed for carrying pressurized fluids, such as water, through a supply system in houses and commercial buildings. In assembling such systems, conventionally professional plumbers, as well as do it yourself homeowners, perform the task widely referred to as "sweating copper."

Sweating copper is another term for the task of soldering a pipe or joint to an engageable pipe fitting for the purpose of connecting the two fluid-carrying components in an operative sealed engagement which will handle internal pressure. Such is a widely employed basic plumbing process employed in building and retrofit construction projects throughout the world. During the process of sweating copper or other tubing to be soldered, it is extremely important that all surfaces of contact between the pipe and the fitting to be engaged be properly prepared. Such preparation conventionally involves the removal of any dirt, grime, and especially oxidation, from the two surfaces to be joined with solder. Without this preparation, a leak-proof connection between the pipe and fitting cannot be guaranteed.

Conventionally, this task of cleaning and removal of oxidation is accomplished by sand paper or emery cloth or a wire brush in a time-consuming action. The user must essentially use sand paper or the wire brush to impart an abrasive action to the surfaces to be joined to remove the dirt or oxidation therefrom. During the process they must continually stop the use of the brush or sand paper or other abrasive object and inspect the pipe and fitting surface being treated. Should such visual inspection show areas on the pipe of fitting still in need of oxidation or dirt removal, the process is repeated.

As can be discerned, when attempting such oxidation and dirt removal in the dark confines of a basement or cupboard or crawlspace, visually ascertaining clean surfaces is challenging at best. Further, the process is extremely time consuming and fraught with the potential that the surfaces treated are not properly cleaned. While improper cleaning of oxidation and grime may not immediately cause a fluid leak at the soldered joints, over time there is a huge potential for such. However, fluid leaks at a subsequent date after the building is completed and the plumbing is hidden in walls and floors and the like, can cause structural damage as well as damage to building contents. Still further, fixing such a leak will require walls or floors to be cut to provide access to the offending pipes.

The device herein provides a tool configured to easily remove all oxidation and dirt and grime from the exterior of pipes and the interior of fittings to which the pipes are to be soldered. Using the disclosed device a user, in short order, can achieve pipes and fittings which are totally clean and ready for soldering to form soldered joints which will last for years without fear of oxidation or grime causing improper soldering which yields leaky and failed connections.

It should be noted, the forgoing examples of related art and limitations related therewith in the field of pipe and joint soldered connections are intended to be illustrative and not exclusive, and they do not imply any limitations on the device and method described and claimed herein. Various limitations of the related art are already known or will become apparent to those skilled in the art upon a reading and understanding of the specification below and the accompanying drawings

SUMMARY OF THE INVENTION

The present invention is directed toward a device and method for cleaning the surfaces of pipe and fittings, such as copper pipe, prior to soldering of pipe sections to fittings engaged with them. The device in both modes features a body which is adapted to engage with a powered motor for rotation, such as a hand drill. Each body has a plurality of slots formed therein, for operative positioning of a plurality of abrasive cleaning blades. Biasing members or tension springs, such as leaf or coil springs contacting a base of each abrasive cleaning blades, impart a force or bias of the blade toward the surface of pipe or fitting to be cleaned.

The cleaning blades each have a base portion which is formed with a ledge to limit the biased travel of the abrasive cleaning blades within the respective slot it occupies. Currently, the abrasive portion is formed of composite material consisting of coarse-particle aggregate pressed and bonded together by a cementing matrix in a composite including one or a combination of abrasive materials from a group including aluminum oxide, silicon carbide, ceramic, diamond, and cubic boron nitride. Of course, other aggregate material as would occur to those skilled in the art may be employed and is considered within the scope of the claims herein.

In one mode of the device herein, the device is configured to be positioned within the interior of the pipe fitting to remove internal oxidation or debris. In an alternative mode, the device is configured for positioning around the outside surface of the pipe or pipe fitting to remove external oxidation or debris.

In all modes of the device herein, the device is configured with a body having slots formed therein. Each of the slots has a cleaning blade therein which is biased by a spring member. Each spring member contacts a base on one side which is engaged to an abrasive portion on an opposite side.

The spring member is positioned to impart a biasing force to the cleaning blade to urge it in a direction toward and against the position of a pipe surface to be cleaned. It is preferred in all modes of the device that the body holding the cleaning blades is configured for a connection to a powered rotation tool such as a hand drill, which will impart rotation to the body during use.

Additionally common to all modes of the device herein, the body is formed with a sidewall extending between a first end and a second of the body. The first end of the body is adapted for operative engagement to a drill motor, which will impart a powered rotation to the body of the device.

The body of the device has a plurality of slots therein running generally parallel to a longitudinal axis of the body. Each of the slots in the plurality of slots extends to a respective opening positioned in the sidewall of the main body. Located in each slot, is a respective cleaning blade having a base with a first side in contact with a biasing member located in the respective slot. An abrasion portion of each cleaning blade is engaged to a second side of the base, and as each biasing member imparts a force to a respective cleaning blade, it urges the abrasion portion to extend from the opening of the respective lot and outside the body, in a direction toward the pipe surface to be cleaned. A removable cap on the second end of the body, provides access to the slots to allow replacement of the cleaning blades when worn.

In this configuration, with the body operatively coupled to a powered motor such as a drill motor, powered rotation of the body will rotate the plurality of biased cleaning blades against the surface of the pipe or fitting, thereby removing oxidation or debris therefrom.

The device may be provided in one or two modes of operation. In a first mode, the body is configured for positioning within the internal cavity of a pipe fitting or pipe for cleaning of an inner wall surface. In a second mode of configuration, the device may be provided with the body configured with an internal cavity with which the biased cleaning blades communicate, to clean the exterior surface of the pipe positioned within the internal cavity. In a particularly preferred mode of the device herein, two bodies are provided to allow either inner wall cleaning or outer wall cleaning, and the body for inner wall cleaning is adapted to nest within the cavity of the body for outer wall cleaning when not in use. Either of the two modes of the body and device, can be provided alone without the other and such is anticipated.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements. Further, where employed herein, by the term "substantially" unless otherwise specifically defined, is meant, plus or minus five percent.

It is an object of this invention to provide a device and system for easy and complete cleaning of the exterior and/or interior surfaces of pipes and fittings prior to such being soldered.

It is a further object of this invention to provide such a device which employs easily replaceable slot-engaged abrasive cleaning blades.

It is yet a further object of this invention to provide an abrasive pipe cleaning system adapted for engagement to a powered rotating tool such as a hand drill to allow widespread use without the need to buy expensive hand tools.

The invention, accordingly, comprises the features of construction, combination of elements, and arrangement of parts which will be exemplified by the constructions hereinafter set forth, and the scope of the invention will be indicated in the claims.

With respect to the above summary description, before explaining at least one preferred embodiment of the herein disclosed eye treatment system in detail, it is to be understood that the invention is not limited in its application to the details of construction and to the arrangement in the following description or illustrated in the drawings. The pipe and fitting surface cleaning device and system herein described, is capable of other embodiments and of being practiced and carried out in various ways which will become obvious to those skilled in the art on reading this disclosure. Also, it is to be understood that the phraseology and terminology employed herein are for the purpose of description and should not be regarded as limiting.

As such, those skilled in the art will appreciate that the conception upon which this disclosure is based, may readily be utilized as a basis for designing other rotating abrasive pipe surface cleaning systems and devices, and for carrying out the several purposes of the present disclosed system. It is important, therefore, that the claims herein be regarded, as including such equivalent construction and methodology as would occur to those skilled in the art subsequent to reading this disclosure, insofar as they do not depart from the spirit and scope of the present invention.

BRIEF DESCRIPTION OF DRAWING FIGURES

The accompanying drawings, which are incorporated herein and form a part of the specification, illustrate some, but not the only or exclusive examples of embodiments and/or features of the pipe and fitting cleaning and preparation invention. It is intended that the embodiments and figures disclosed herein are to be considered illustrative rather than limiting.

In the drawings.

DETAILED DESCRIPTION OF THE EXEMPLARY EMBODIMENTS

In this description, any directional prepositions if employed, such as up, upwardly, down, downwardly, front, back, first, second, first end, second end, top, upper, bottom, lower, left, right and other such terms refer to the device or depictions as such may be oriented are describing such as it appears in the drawings and are used for convenience only. Such terms of direction and location are not intended to be limiting or to imply that the device herein has to be used or positioned in any particular orientation.

Figure 1:
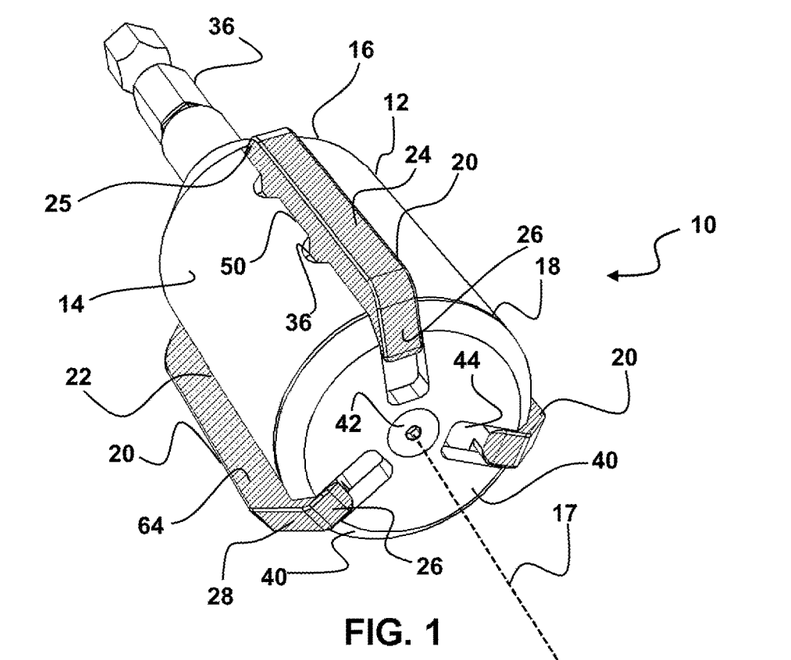
FIG. 1 depicts a front perspective view of a mode of the device herein having the body configured for removing oxidation from the internal passage of a metal pipe, showing the plurality of abrasive cleaning blades in a biased sliding engagement within slots formed in a body, which are biased to a projecting position from the slots.
Figure 2:
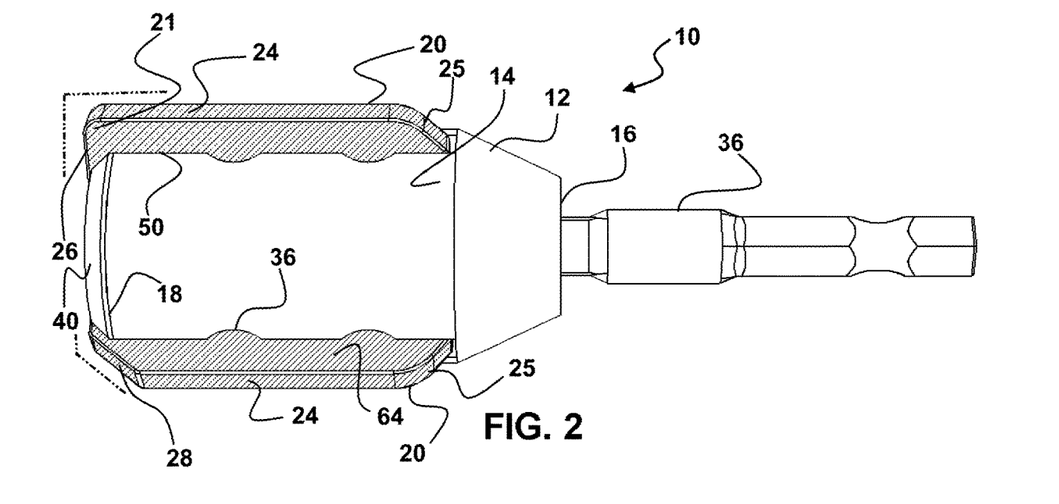
FIG. 2 is a side view of the device of FIG. 1, showing one of the plurality of cleaning blades formed with the vertical and horizontal edges of the leading corner being substantially perpendicular to each other, and the remainder of leading corners of the plurality of cleaning blades being preferably a beveled leading corner edge.
Figures 3, 4:
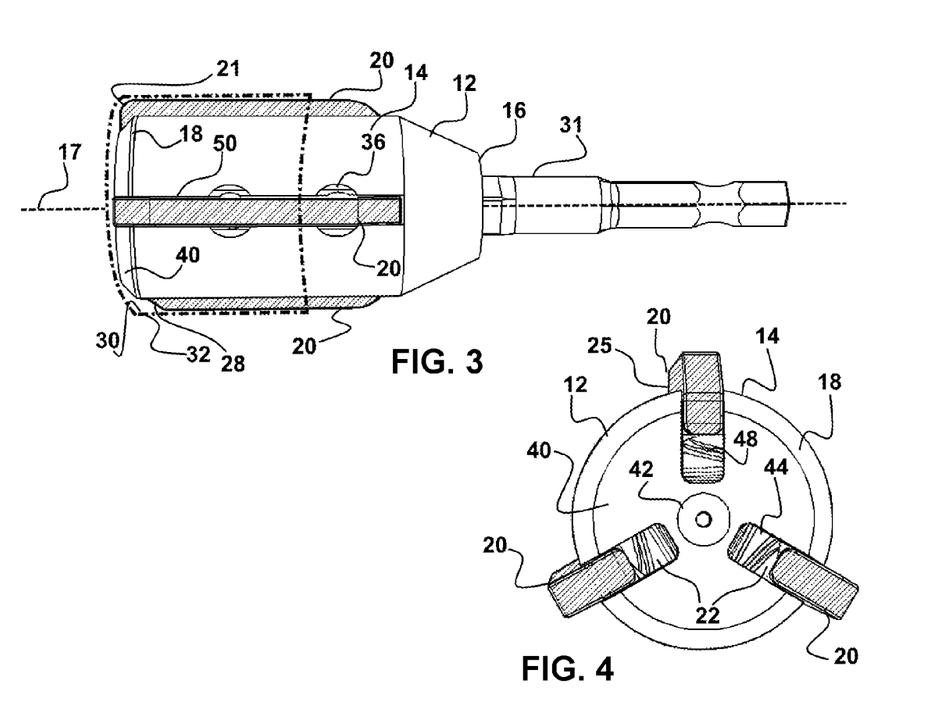
FIG. 3 depicts the device of FIGS. 1-2 operatively engaged with an interior surface of a metal pipe or cap shown in dotted line, depicting the preferred leading corner having substantially perpendicular edges cleaning the interior surface up to an end cap of the fitting, and the other two leading corners being beveled for aiding in insertion.
FIG. 4 shows a second end or leading end view of the body of the device of FIGS. 1-3, depicting biasing members such as springs forcing the three radially positioned cleaning blades to project from slots formed in the body, in a direction away from the axis thereof.

Now referring to drawings in FIGS. 1-12, wherein similar components are identified by like reference numerals, there is seen in FIG. 1 a front perspective view of a mode of the device 10 herein having a body 12 having a longitudinal axis 17 with the body 12 configured for removing oxidation from the internal passage of a metal pipe 32 such as in FIG. 3. As shown, the body 12 has a sidewall 14 extending between a first end 16 and a second end 18. A plurality of abrasive cleaning blades 20 are respectively located in a biased sliding engagement within slots 22 formed into the body 12. Each cleaning blade 20 is spring loaded or biased by a spring member to place a portion thereof projecting from the slots 22.

In FIG. 2 is shown a side view of the device of FIG. 1. As depicted, one of the plurality of cleaning blades 20 has a rectangular leading corner edge 21. By leading corner edge is meant the corner of a cleaning blade 20 which contacts the pipe surface when inserted therein or there around. By rectangular leading corner is meant that the leading corner is formed with the horizontal edge 24 of the abrasive material 25 and the vertical edge thereof 26, running substantially perpendicular to each other. The leading corner of the other cleaning blades 20 have a beveled portion 28 communicating between the horizontal edge 24 and the vertical edge 26 thereof.

Also shown in FIG. 2, is the first end 16 configured for engagement with a motor such as a drill motor, through the provision of either a mounting recess 29 for an engagement member 31, formed into the first end 16 of the body 12, or affixing an engagement member 31 to the first end 16 of the body 12. The engagement member 31 is employable to form an operative engagement with the chuck of a hand drill (not shown but well known).

The rectangular leading corner edge 21 is particularly preferred, as shown in FIG. 3, to allow the device 10 to reach as far as possible along the interior wall 30 of a capped pipe 32 such as in FIG. 3, to remove oxidation. The other of the plurality of cleaning blades 20 with the respective leading corners having beveled portion 28 are preferred, to better enable the insertion of the device 10 as in FIGS. 1-2, into the interior of a pipe 32 during use. Thus, while the device 10 of FIGS. 1-5 will function with just beveled portions 28 on all of the cleaning blades 20, it functions better to clean more of the interior wall 30 of capped pipe 32 fittings, which are frequently used, and it is preferred for the mode of the device 10 for use on interior walls 30, that the rectangular leading corner edge 21 be included.

Figures 6, 7, 8, 9, 10:
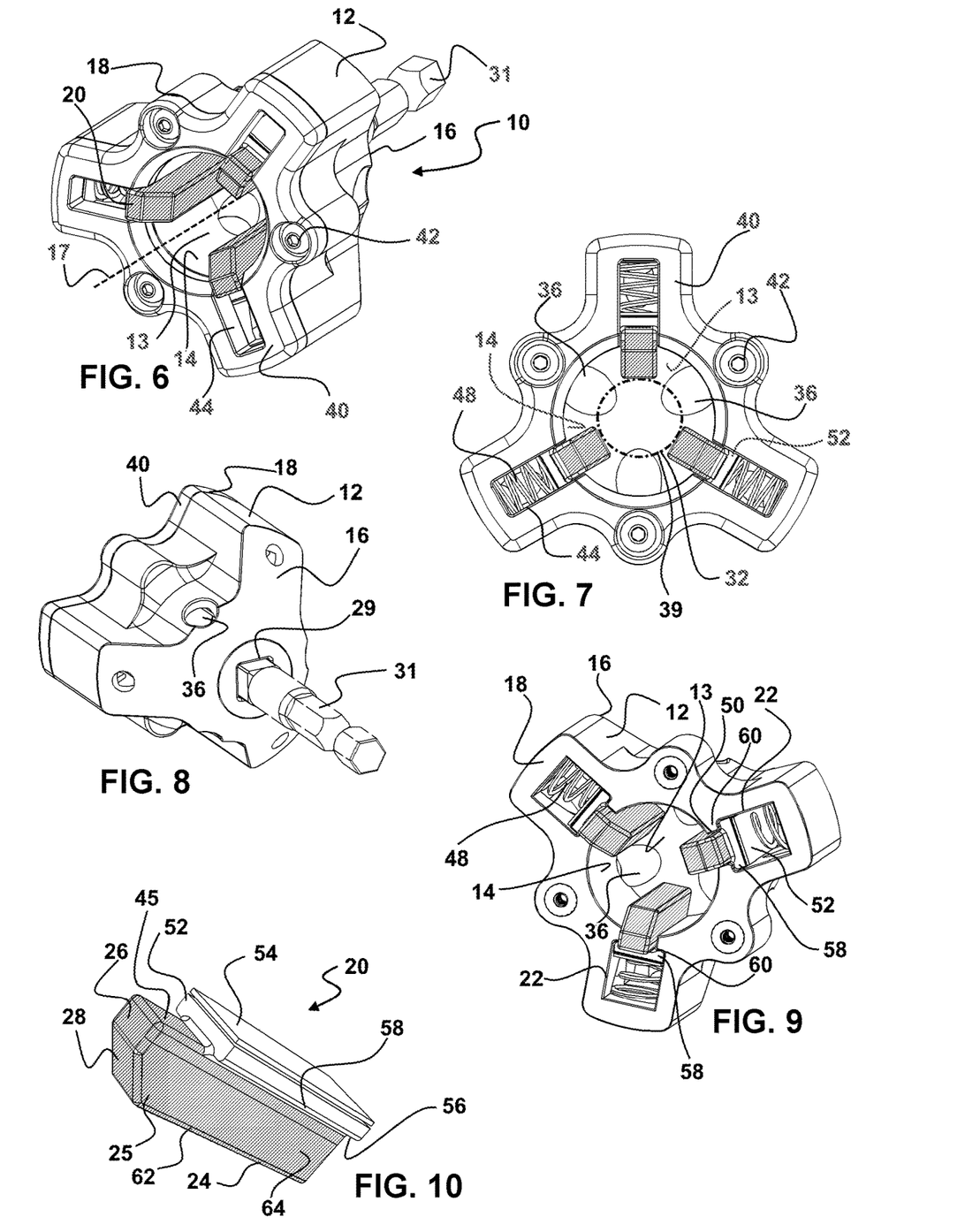
FIG. 6 shows a mode of the device where the body is configured for cleaning the exterior surface of a pipe or tube having the cleaning blades positioned in the slots formed in the body which are biased toward an internal cavity and longitudinal axis of the body to project through blade openings into a cleaning chamber.
FIG. 7 shows a view of the device of FIG. 6 from a leading or front end thereof and shows springs biasing the cleaning blades to project toward a central axis and into the cleaning chamber.
FIG. 8 depicts a rear view of the device of FIGS. 6-7 showing a member extending from a rear end of the body which is adapted to engage a rotating tool such as a drill.
FIG. 9 depicts the device as in FIG. 6-7, showing the front cap removed allowing removal and replacement of the cleaning blades.
FIG. 10 depicts a typical cleaning blade for the device of FIGS. 6-9, showing an abrasive portion engaged to one side of a base defining a ledge which limits the travel of the cleaning blade toward the cleaning chamber when engaged as in FIG. 9.

Also preferred in the device 10 as shown in FIG. 3 and FIG. 7, are debris collection openings 36 formed into the body 12. These debris collection openings 36 are particularly preferred as they collect the debris and oxidation which the cleaning blades 20 grind from the pipe 32 surface, such as the interior wall 30 shown in FIG. 3 or the exterior wall 39 as in FIG. 7. While the device 10 will function without these debris collection openings 36 in a significant improvement over the current art, without these debris collection openings 36 formed into the body 12, in experimentation with the device 10, the debris from the pipe surface can build up and cause the cleaning to be less effective.

Figure 5:
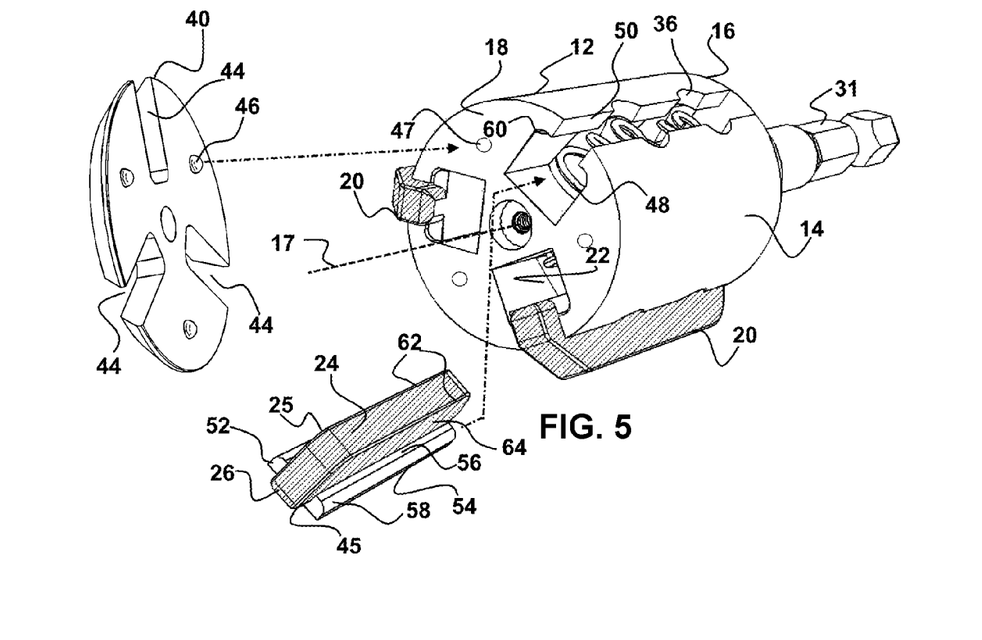
FIG. 5 depicts the device as in FIG. 3-4 showing the easy replacement of worn cleaning blades once an endcap is removed from the leading or second end of the body.

In FIGS. 3-5 are shown, the second end 18 of the body 12 in different views. At the second end 18 of the body 12 in all modes of the device 10 herein, is preferably positioned a removable cap 40 which allows for the easy replacement of the cleaning blades 20, when worn, into the slots 22 from the first end 18 when the cap 40 is removed. The cap 40 is held to the body 12, by a removable fastener such as a screw 42.

Also shown, are cap slots 44 formed into the cap 40. These are most preferred as when the cap 40 is engaged to the second end 18 of the body 12, it allows a leading portion 45 of the abrasion portion 25 of the cleaning blades 20, to project into the cap slots 44, and forward of the second end 18 of the body 12. The leading portion 45 is shown projecting in for example FIG. 4, and in the mode of the device 10 of FIG. 6. The cap 40 has alignment pins 46 which engage within alignment recesses 47 to prevent the cap 40 from rotating during high speed rotation on use, to prevent misalignment of the cap slots 44 and slots 20 in the body 12. In the mode of the device 10 of FIG. 6-9, screws 40 engage in holes in the body 12 and maintain this alignment of the cap slots 44 with the slots 22 in the body 12.

Shown in FIG. 4-5, the cleaning blades 20 are all slidably positioned within the slots 22 formed into the body 12, and a biasing member 48 located in each respective slot 22 serves to impart a biasing force to the cleaning blade 20 to cause the abrasive portion 25 to project through blade openings 50 in the sidewall 14 aligned with the slots 22, for a distance from the sidewall 14.

As can be seen in FIG. 4, the cap has an engaged position with the cap slots 44 held aligned with the slots 22 in the body 12 and a disengaged position shown in FIG. 5 where the cap 40 is shown in a removed position. With the cap in the removed position, as noted, the cleaning blades 20 may be removed from the respective slot 22 it occupies and replaced.

In FIG. 5 and FIG. 10, the cleaning blades 20 are shown in a preferred configuration. A blade base 52 having a first side 54 configured to contact against the biasing member 48 such as a spring, and has the abrasive portion 25 of the cleaning blade 20 connected to a second side 56 of the blade base 52. This blade base 52 is preferred in all modes of the device 10 herein as it has a ledge 58 projecting along side edges which contacts a ridge 60 adjacent the blade openings 50 in the body 12 and limits the travel of the cleaning blades 20 and the abrasion portion 25 thereof, toward and through said blade openings 50. This travel limitation insures that the size of a projecting area of the abrasive portion 25 of the cleaning blade 20 extending from the sidewall 14 through the blade opening 50, is maintained substantially equal for all of the plurality of cleaning blades 20. This equal extension helps maintain balance to the device 10 as it is rotated during use.

Additionally shown in FIG. 5 and FIG. 10, are elongated beveled surfaces 62 positioned between the horizontal edge 24 and side surfaces 64 of the abrasive portion 25 of the cleaning blades 20. While the device 10 will function much better than existing art for cleaning pipes without these beveled surfaces 62 on the cleaning blades 20, if was found in experimentation, that debris was better deposited in the debris collection openings 36 during use, when the beveled surfaces 62 are included.

Shown in FIGS. 6-10 is a mode of the device 10 which operates in the same fashion as that of FIGS. 1-5, which has the body 12 configured with a circular shaped interior cavity 13 surrounded and defined by the sidewall 14 which encircles the longitudinal axis 17 of the body. The body 12 is configured at the first end 16 for operative engagement with a rotating motor such as the chuck of a hand drill, either inclusion of the engagement member 31 in an attachment to the first end 16, or provision of a mounting recess 29 sized for a conventionally used engagement member.

This mode of the device 10 as noted operates in the same fashion as that of FIGS. 1-5, wherein each of the cleaning blades 20 are slidably positioned with a respective slot 22 which communicates with a respective blade opening 50 in the sidewall 14 which defines the diameter of the interior cavity 13 into which a pipe 32 is inserted to clean the exterior wall 39 such as in FIG. 7.

In the same fashion as that of FIGS. 1-5, and shown in FIGS. 7 and 9, the cleaning blades 20 slidably positioned in the slots 22 formed in the body 12 are biased to project through the blade openings 50 aligned with the slots 22 and past the sidewall 14, and toward the longitudinal axis 17 running through the internal cavity 13.

Shown also in FIG. 7, is the cap 40 in the engaged position at the second end 18 of the body 14 with the cap slots 44 aligned with the slots 22 formed in the body 12. Fasteners such as screws 42 hold the cap 40 in the engaged position of FIG. 7, and are removable to allow the cap to be disengaged to the removed position of FIG. 9. With the cap 40 removed, in the same fashion as noted above, the individual cleaning blades 20 may be removed and replaced.

The preferred debris collection openings 36 are shown in FIGS. 6-9 which as noted, provide a collection area for oxidation material removed from the pipe during use and enhance operation of the device 10.

In FIG. 10 is shown an enlarged view of the cleaning blades 20 used herein in all modes of the device 10. As shown the blade base 52 has a first side 54 for contact with the biasing members 48 such as springs positioned in the slots 22. The abrasive portion 25 of the cleaning blades 20 is connected to a second side 56 of the blade base 52. A ledge 58 extends past both side surfaces 64 of the abrasive portion 25 and service as a stop when contacting the ridge 60 adjacent the blade openings 50 which are aligned with the slots 22.

Additionally shown are the leading portion 45 of the abrasive 25 projecting forward from the blade base 54. The leading portion 45 projects into the cap slots 44 formed into the cap 40 such as shown in FIG. 5 and configured in the cap 40 of FIGS. 6-8 in the same fashion so as to align with the slots 22 in the body 12 at the second end 18 of the body 14. In this fashion, removal of the cap 40 as noted, provides the user easy access to the plurality of slots 22 so they may remove and replace any of the cleaning blades 20 as needed.

Figure 11:
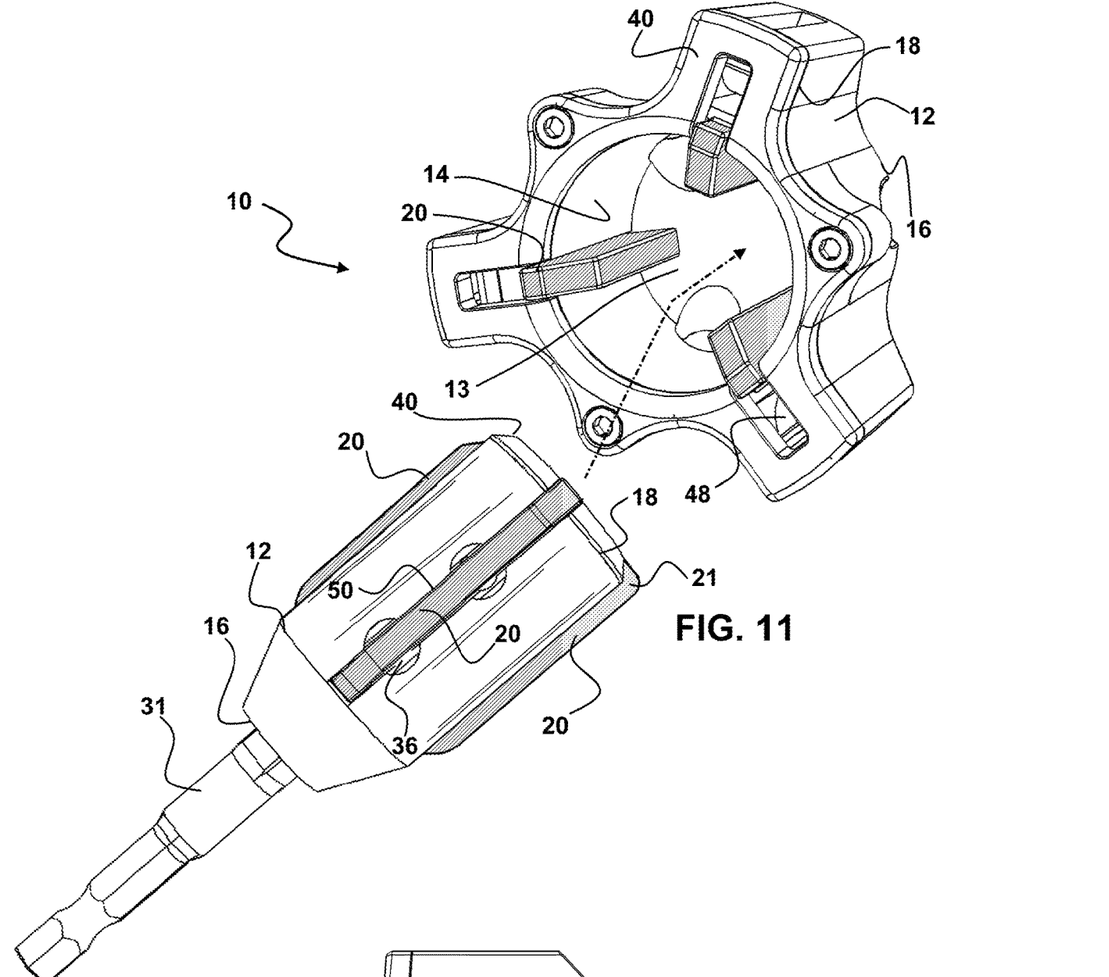
FIG. 11 is an exploded view of the device of FIG. 1 and FIG. 6, showing that when provided with both body types together, the two can engage to a nesting configuration as in FIG. 12 for storage and transport.

As noted, the device 10 functions in the same fashion in both the mode for exterior pipe cleaning and interior pipe leaning and can be provided in singular versions in such configurations. It may also be provided with the body 12 in both configurations such as shown in FIG. 11, allowing the user to choose which to employ depending on the task to be completed.

Figure 12:
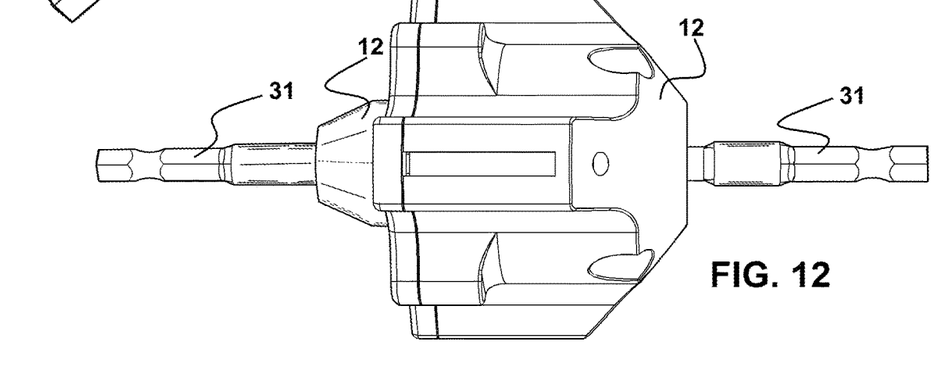
FIG. 12 depicts the device with the body as in FIG. 1 nested into the cleaning cavity of the device with the body configuration of FIG. 6, and held by the biased contact of the cleaning blades.

When provided in a set of both body 12 configurations, the device 10 is configured so that the body 12 formed for interior pipe cleaning will nest within the internal cavity 13 of the body 12 formed for external pipe surface cleaning such as in FIG. 12. The biased contact of the cleaning blades 20 extending from the sidewall 14 of the body 12 configured for internal pipe cleaning, will frictionally engage the sidewall 14 of the body 12 configured for external pipe surface cleaning and maintain this nesting during storage.

Although the invention has been described with respect to particular embodiments thereof, it should be realized that various changes and modifications may be made therein without departing from the spirit and scope of the invention. While the invention as shown in the drawings and described in detail herein discloses arrangements of elements of particular construction and configuration for illustrating preferred embodiments of structure and method of operation of the present invention, it is to be understood, however, that elements of different construction and configuration and other arrangements thereof, other than those illustrated and described, may be employed in accordance with the spirit of this invention. Any and all such changes, alternations and modifications as would occur to those skilled in the art are considered to be within the scope of this invention as broadly defined in the appended claims.

Further, the purpose of the attached abstract is to enable the U.S. Patent and Trademark Office and the public generally, especially scientists, engineers and practitioners in the art who are not familiar with patent or legal terms or phraseology to determine quickly, from a cursory inspection, the nature and essence of the technical disclosure of the application. The abstract is neither intended to define the invention of the application, which is measured by the claims, nor is it intended to be limiting as to the scope of the invention in any way.

What is claimed is:

1. A pipe cleaning tool configured for engagement with a drill motor, comprising:

a body having a sidewall running between a first end and a second end of said body;

said first end of said body configured for engagement with a drill motor;

a plurality of slots extending along the body substantially parallel to a longitudinal axis of said body;

each of said plurality of slots communicating with a respective blade opening in said sidewall of said body;

a plurality of cleaning blades, one each of said plurality of cleaning blades positioned in a respective one of each of said plurality of slots;

each said cleaning blade having a base having a first surface;

each said cleaning blade having an abrasion portion thereof positioned on a second surface of said base, opposite said first surface;

a biasing member positioned in each respective slot and contacting a said first surface of a base of a respective said cleaning blade positioned therein, with a biasing force;

said biasing force urging each said cleaning blade to a projecting position, said projecting position having said abrasion portion of said cleaning blade projecting through a said blade opening and into an area surrounding said sidewall;

each respective said slot, extending to a slot opening at said second end of said body;

a cap, said cap engageable to said second end of said body with a fastener;

said cap having an engaged position in a fixed connection to said second end, said cap in said engaged position covering said slot openings;

said cap having a removed position exposing said plurality of slot openings;

each said cleaning blade in said plurality thereof, being removably positionable into a respective slot, through a respective slot opening from said second end of said body with said cap in said removed position, whereby each of said cleaning blades in said plurality thereof, may be replaced by sliding it from said slots with said cap in said removed position; and wherein a pipe surface positioned to contact said abrasion portions of said plurality of cleaning blades, is cleaned of oxidation by said abrasion portions of said cleaning blades during rotation of said body while coupled to said drill motor.

2. The pipe cleaning tool of claim 1, additionally comprising:

said abrasion portion of at least one of said plurality of cutting blades having a substantially rectangular leading corner; and a respective leading corner of the other of said plurality of cutting blades having a beveled edge at said leading corner.

3. The pipe cleaning tool of claim 2, additionally comprising:

a collection opening formed in said body, said collection opening collecting said oxidation removed by said abrasion portions.

4. The pipe cleaning tool of claim 3, additionally comprising:

said sidewall defining an exterior circumference of said body.

5. The pipe cleaning tool of claim 2, additionally comprising:

said sidewall defining an exterior circumference of said body.

6. The pipe cleaning tool of claim 2, additionally comprising:

said sidewall defining a circular wall of an interior cavity of said body, said circular wall surrounding a longitudinal axis of said body.

7. The pipe cleaning tool of claim 1, additionally comprising:

a collection opening formed in said body, said collection opening collecting said oxidation removed by said abrasion portions.

8. The pipe cleaning tool of claim 1, additionally comprising:

said sidewall defining an exterior circumference of said body.

9. The pipe cleaning tool of claim 1, additionally comprising:

said sidewall defining a circular wall of an interior cavity of said body, said circular wall surrounding a longitudinal axis of said body.

10. The pipe cleaning tool of claim 9, additionally comprising:

a ridge formed in each said slot adjacent a respective said blade opening aligned therewith;

each said base of each said cleaning blade having a ledge thereon; and contact of said ledge with said ridge limiting a distance of travel of said abrasion portion through said blade openings.

* * * * *